(12) United States Patent
Fong et al.

(10) Patent No.: US 12,238,512 B2
(45) Date of Patent: Feb. 25, 2025

(54) RADIO FREQUENCY (RF) EMITTER DETECTOR

(71) Applicant: PPIP LLC, Tempe, AZ (US)

(72) Inventors: Michael Fong, Tempe, AZ (US); Neric Hsin-wu Fong, Tempe, AZ (US); Sowjitha Idukuda, Tempe, AZ (US); Shoor Veer Singh, Tempe, AZ (US)

(73) Assignee: PPIP, LLC, Tempe, AZ (US)

( * ) Notice: Subject to any disclaimer, the term of this patent is extended or adjusted under 35 U.S.C. 154(b) by 776 days.

(21) Appl. No.: 17/467,434

(22) Filed: Sep. 6, 2021

(65) Prior Publication Data

US 2022/0060885 A1    Feb. 24, 2022

Related U.S. Application Data

(63) Continuation of application No. 16/409,791, filed on May 11, 2019, now Pat. No. 11,115,815.
(Continued)

(51) Int. Cl.
*H04W 12/02* (2009.01)
*H04L 5/00* (2006.01)
(Continued)

(52) U.S. Cl.
CPC .......... *H04W 12/02* (2013.01); *H04L 5/0048* (2013.01); *H04W 72/04* (2013.01); *H04W 72/20* (2023.01)

(58) Field of Classification Search
CPC ..... H04W 12/02; H04W 72/04; H04W 72/20; H04W 84/12; H04W 24/08; H04L 5/0048; H04L 5/005; H04L 27/0006
See application file for complete search history.

(56) References Cited

U.S. PATENT DOCUMENTS

2006/0128311 A1 * 6/2006 Tesfai ................ G01S 5/0252
455/67.11
2010/0124886 A1 * 5/2010 Fordham ............. H04B 17/382
455/67.11
(Continued)

FOREIGN PATENT DOCUMENTS

WO    WO-2019040946 A1 * 2/2019 ............... B65F 1/14

*Primary Examiner* — Charles N Appiah
*Assistant Examiner* — Frank E Donado
(74) *Attorney, Agent, or Firm* — Fernando & Partners, LLP

(57) ABSTRACT

In accordance with some embodiments, an apparatus for privacy protection includes a peripheral interface connectable to a second device. In some embodiments, the second device is operably connectable to a personal communication device and the peripheral interface provides characteristics of communication signals associated with the personal communication device to the second device. The apparatus also includes a radio frequency (RF) detection device operable to detect energy carrying a communication signal to or from the personal communication device. The apparatus further includes a controller, coupled to the peripheral interface and the RF detection device, operable to scan an RF spectrum of the communication signal, received by the RF detection device, in order to identify communications associated with the personal communication device, and generate a notification upon determining that abnormal activities exist in the communications, wherein the notification triggers interruption of the communication signal.

17 Claims, 16 Drawing Sheets

Related U.S. Application Data

(60) Provisional application No. 62/671,312, filed on May 14, 2018.

(51) Int. Cl.
*H04W 72/04* (2023.01)
*H04W 72/20* (2023.01)

(56) References Cited

U.S. PATENT DOCUMENTS

| | | |
|---|---|---|
| 2011/0197006 A1 | 8/2011 | Li et al. |
| 2012/0151364 A1 | 6/2012 | Chueh et al. |
| 2014/0274184 A1* | 9/2014 | Regan .................. H04W 24/02 455/515 |
| 2015/0163393 A1 | 6/2015 | Kim |
| 2016/0260059 A1* | 9/2016 | Benjamin .......... G06Q 10/0833 |
| 2016/0381545 A1 | 12/2016 | Wang et al. |
| 2018/0063709 A1* | 3/2018 | Morrison ............ H04W 12/069 |
| 2018/0180709 A1* | 6/2018 | Eaves ....................... G01S 5/06 |
| 2018/0184294 A1 | 6/2018 | Liu et al. |
| 2018/0219885 A1 | 8/2018 | Ahmadzadeh et al. |
| 2019/0068651 A1 | 2/2019 | Briggs et al. |
| 2019/0334943 A1 | 10/2019 | Arvanites et al. |
| 2019/0342874 A1 | 11/2019 | Davydov et al. |
| 2020/0044796 A1 | 2/2020 | Yang et al. |

\* cited by examiner

```
*Found cell_id: 87 CP: Normal , DetectRatio=50% PSR=24.12, Power=-82.0 dBm
 Found cell_id: 0 CP: Normal , DetectRatio= 0% PSR=0.00, Power=-inf dBm
 Found cell_id: 0 CP: Normal , DetectRatio= 0% PSR=0.00, Power=-inf dBm
Decoding PBCH for cell 87 (N_id_2=0)
- Asking for clock rate 23.040000 MHz...
- Actually got clock rate 23.040000 MHz.
- Performing timer loopback test... pass
Setting sampling rate 23.04 MHz
Finding PSS... Peak:          6.1; FrameCnt: 0, State: 0
Decoded MIB, SFN: 292, offset: 1
Decoded STB1, Payload: [08 4c 42 82 10 b1 ca 21 df 09 82 75 04 60 20 01 0b 05 98
46 c9 81 00 61 00 00 00 1:
```

FIG. 9

| Parameters | Source |
|---|---|
| K<sub>ASME</sub> 1402 | USIM |
| NAS Count 1404 | USIM |
| Alg-ID 1406 | USIM |
| Physical cell ID 1408 | UES L3 PHY DMRS |
| C-RNTI 1410 | UES L3 PHY Exhaustive Search |

FIG. 14

RADIO FREQUENCY (RF) EMITTER DETECTOR

PRIORITY CLAIM

This application claims priority to U.S. patent application Ser. No. 16/409,791 filed on May 11, 2019, which further claims priority to U.S. provisional patent application No. 62/671,312 filed on May 14, 2018, the contents of which are hereby incorporated by reference.

TECHNICAL FIELD

This relates generally to the field of privacy protection, and more specifically to a system, method, and apparatus for detecting and mapping radio frequency (RF) emitter(s).

BACKGROUND

Many enterprises invest heavily on private network infrastructure. Outside the private networks, however, enterprises often do not have much visibility and lack control of network activities, e.g., the network activities in cellular networks or in networks provided by public WiFi hotspots. For example, many smart devices used by employees are produced by manufacturers that have closed ecosystems. As such, enterprises often do not have visibility to activities and mechanisms on the smart devices produced by the closed ecosystems. In order to gain network visibility, some enterprises install Enterprise Mobility Management (EMM) software on smart devices. However, once a smart device is comprised, data gathered by EMM may not be trustworthy. In other words, enterprises cannot solely rely on EMM to accurately detect potential threats. Further, many smart devices do not have a switch to quickly cease operation. Thus, even if a potential threat is detected, the enterprises cannot stop spread of the threat in a timely fashion.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIG. 9 is an exemplary screen capture of a UES L2 cell tower identification result in accordance with some embodiments;

FIG. 14 illustrates an exemplary cipher key derivation scheme in accordance with some embodiments.

Figure 1:
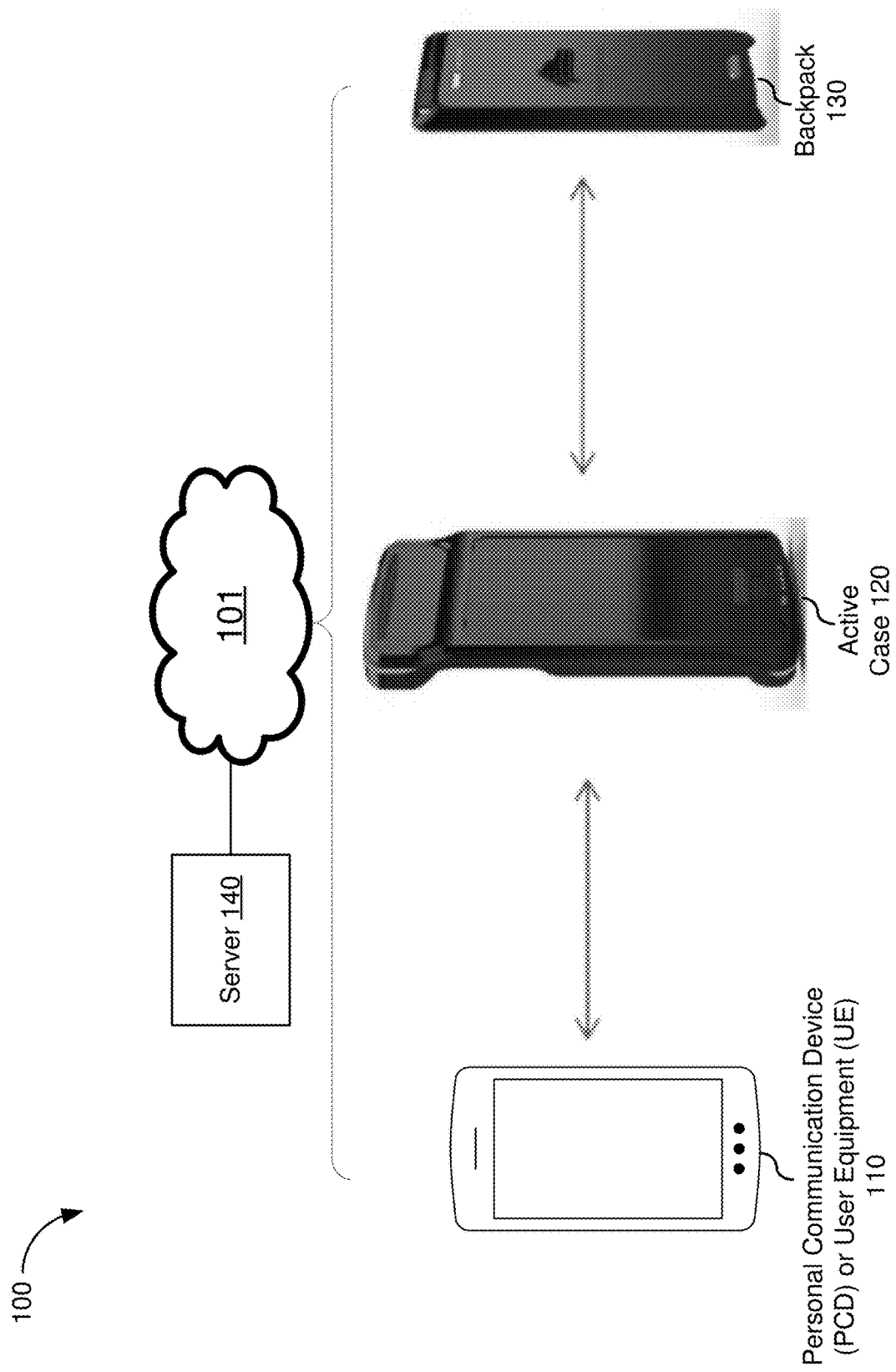
FIG. 1 is a block diagram of an exemplary radio frequency (RF) emitter detection system in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus (e.g., a user equipment sniffer (UES) or a radio frequency (RF) sniffer) that protects a device (e.g., a smart device) and provides enterprises network visibility and network control. The protection is effective even when the device operates in a public network (e.g., a cellular network or a network provided by a public WiFi hotspot). The apparatus can be an active case (also known as a safe case, a secure case, an active base, or a case) and/or a backpack (also known as a supplemental functional device) attached to the active case. The apparatus can detect in-range RF emitters, work with other RF sniffers to geolocate, track and map RF emitters, e.g. detecting a rogue base station and transmitting the rogue station information to the cloud for mapping. Further, the apparatus can use data from one or more RF sniffers and/or with external data sources (e.g. FCC cell tower database (DB), internal or other 3rd party DBs, etc.) and take action based on the information.

In some embodiments, for network visibility, the apparatus wirelessly sniffs packets transmitted from the device and extracts TCP and IP headers for packet tracking. The apparatus also detects abnormal activities in active RF spectrum and sends notifications to a server and/or a user of the protected device. The data link can be shut down by, e.g., EMM, a local switch, and/or a physical RF shielding cover, etc. In some embodiments, for network control, the apparatus triangulates and reports RF emitters and allows the threat to be removed physically or avoided geographically. In some embodiments, the apparatus also transmits desensitization signals within the RF shielding cover to further improve RF shielding and prevent the device from network access. Thus, relative to conventional privacy protection devices, methods, and systems, the apparatus disclosed herein provides enhanced privacy protection.

In accordance with some embodiments, an apparatus includes a peripheral interface (e.g., backpack bus or a wireless interface to a wireless capable backpack device) connectable (e.g., via physical connectors or wireless modem connectors) to a second device (e.g., an active case, a smart case, a secure case, an active base, or a case), wherein the second device is operably connectable to a personal communication device (e.g., smart phone, wearable, tablet etc.) and the peripheral interface obtains uplink communication signal and downlink communicate signal of the personal communication device through the second device; an radio frequency (RF) detection device (e.g., an RFIC) operable to detect energy carrying a communication signal to or from the personal communication device; and a controller coupled to the peripheral interface and the RF detection device, wherein the controller is operable to scan an RF spectrum of the communication signal, received by the RF detection device, in order to identify communications associated with the personal communication device, and generate a notification in accordance with a determination that abnormal activities exist (e.g., in the network traffic information), wherein the notification triggers interruption of the communication signal.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of an RF emitter detection system 100 is depicted, in accordance with some embodiments. In some embodiments, the RF emitter detection system 100 includes a personal communication device 110 (also known as a user equipment (UE) or a user device), an active case 120 (also known as an active base, a case, an active case, or a secure case), and an supplemental functional device 130 (also known as a backpack) connectable to a server 140 through a network 101. In some embodiments, the active case 120 includes a housing arranged to hold the personal communication device or the user equipment 110 (e.g., smartphone, wearable, tablet, etc.), as will be shown in FIG. 2. In some embodiments, the housing includes a plurality of components mateable with another. In other words, the plurality of components, once mated with one another, form a housing assembly to hold the personal communication device 110. The housing assembly allows a user to insert the personal communication device 110 into the active case 120 for more protection of work-related sensitive information (e.g., in a work mode) or take the personal communication device 110 out of the active case 120 for less monitoring of personal communication by enterprise (e.g., in a personal mode).

Figure 2:
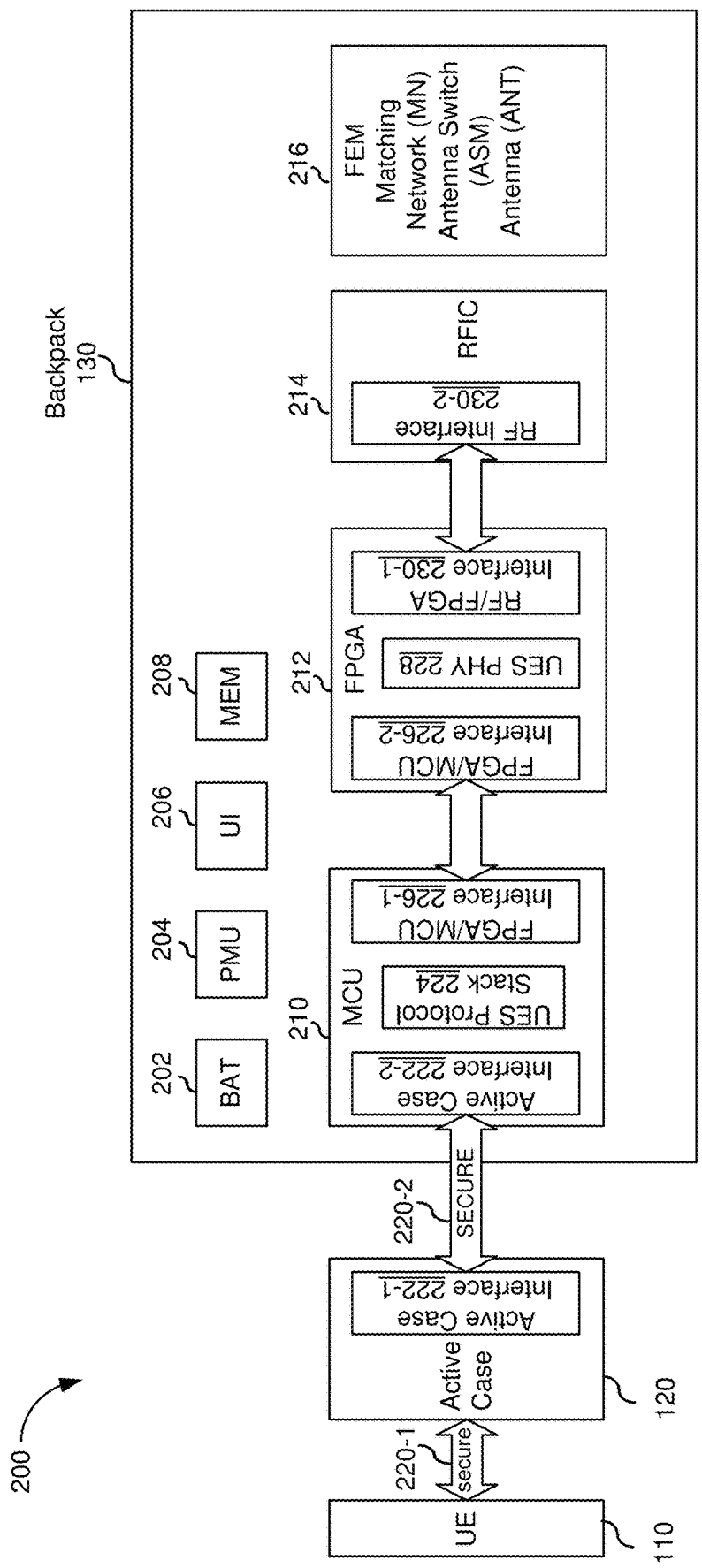
FIG. 2 illustrates an exemplary RF emitter detection architecture for wireless communication characteristics extraction in accordance with some embodiments.

The active base 120 can have one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially support and hold the personal communication device 110, e.g., a partial enclosure as shown in FIG. 2 or a whole enclosure encapsulating the personal communication device 110. When in certain position(s), the housing, along with other components of the active base 120, protects the personal communication device 110 against tracking or spying, e.g., by audio jamming, camera covering, and/or RF shielding, etc. When the one or more moveable components of the housing assembly are in certain other position(s) (e.g., hood slid up), a user can take the personal communication device 110 out of the housing and place the personal communication device 110 in a non-protected mode.

In some embodiments, the active base 120 includes a peripheral interface (e.g., a backpack interface) to connect to a supplemental functional device 130 (e.g., a backpack). The supplemental functional device 130, as described herein, is a device connectable to the user equipment 110 through the active base 120 and provides supplemental functional functions to the user equipment 110. The peripheral interface of the active base 120 is connectable to peripheral interface of the supplemental functional device 130, so that a communication channel between supplemental functional device 130 and the personal communication device 110 can be established.

In some embodiments, the housing of the active case 120 at least partially supports the peripheral interface of the active case 120. For example, the peripheral interface can include a number of connectors (e.g., contact pins or contact pads) connectable to the supplemental functional device 130. In some embodiments, the connectors are affixed to the housing of the active case 120 and at least partially supported by the housing of the active case 120. The connectors are mateable to the peripheral interface of the backpack 130. In some embodiments, the peripheral interface of the active case 120 is wholly supported by the housing of the active case 120, such that the peripheral interface is integrated with or embedded in the housing surface. In such embodiments, connectors from the backpack 130 can be plugged into the peripheral interface of the active case 120 in order to connect the backpack 130 to the active base 120. In some embodiments, the peripheral interface of the active case is operable to communicate with the supplemental functional device 130 via a physical channel including communication connectors. The physical channel forms a secure channel for communication between the active base 120 and the backpack 130.

In some embodiments, the peripheral interface of the active case 120 and/or the backpack 130 is a wireless interface that includes a wireless modem operable to communication wirelessly. For example, the active base 120 can connect to a wireless communication enabled backpack device 130 through a wireless peripheral interface or through a wireless modem of the active case 120. As such, a wireless communication enabled backpack 130 can communicate with the active base 120 without being in contact with the housing of the active case 120 or physically connected to the peripheral interface of the active case 120.

In some embodiments, when paired with the active base 120 and the personal communication device 110, the supplemental functional device 130 is operable to provide supplemental functionalities to the personal communication device 110. For example, the supplemental functional devices can detect RF energy emission, sniff uplink TCP/IP transfer, or detect the presence of chemicals or drugs, etc. The additional information collected by the supplemental functional device 130 can be used by the personal communication device 110 and/or the active case 120 for further intrusion detection and privacy protection. In particular, an RF sniffer on the active case 120 and/or as the backpack 130 attached to the active case 120 can detect in-range RF emitter(s), work with other RF sniffers through the coordination by the server 140 to geolocate, track and map the in-range RF emitters and use the aggregated data from the RF sniffers and/or with external data sources (e.g. FCC cell tower DB, internal or other 3rd party DBs, etc.) to assess the in-range RF emitter(s) and report or take action based on the assessment, e.g. detect rogue base station and transmit the rogue station information to the cloud for mapping.

FIG. 2 illustrates an exemplary block diagram of the backpack 130 as a user equipment sniffer (UES) connectable to the active case 120, in accordance with some embodiments. In some embodiments, the backpack 130 includes a battery 202, a power management unit (PMU) 204, a user interface (UI) 206, a memory 208, a microcontroller (MCU) 210, a Field Programmable Gate Arrays (FPGA) 212, a Radio Frequency Integrated Circuit (RFIC) 214, and a frontend module (FEM) 216. It should be noted that at least some of the RF power detector functions can be integrated into the active case 120 in some embodiments. Thus, the UES can be part of the active case 120, the backpack 130, or the combination of the active case 120 and the backpack 130. In other words, the UES can refer to the active case 120, the backpack 130, or the combination of the active case 120 and the backpack 130. For example, at least part of the functions performed by the MCU 210, the FPGA 212, the RFIC 214, and/or the FEM 216 can be performed by a controller and/or one or more communication circuitries on the active case 120.

In some embodiments, the MCU 210 is connectable to the active case 120 through a secure channel 220, including the secure channel 220-2 established through Object Linking & Embedding (OLE) interface as the active case interface 222-1 on the active case 120 and the active case interface 220-2 on the MCU 210. In some embodiments, a peripheral interface (e.g., backpack bus or a wireless interface to a wireless capable backpack device) connects the MCU 210 to the active case 120, e.g., via physical connectors or wireless modem connectors). The secure communication channel 220 is further described below with reference to FIG. 3.

In some embodiments, the active case 120 is operably connectable to the personal communication device 110 and the peripheral interface, which forms the secure communication channel 220, obtains uplink communication signals and downlink communication signals of the personal communication device 110 through the active case 120. As such, the MCU 210 obtains information associated with the personal communication device 110 through the peripheral interface. In some embodiments, the MCU 210 is coupled to the FPGA 212 through an FPGA/MCU interface 226-1. The MCU 210 executes instructions implementing a protocol stack 224 for context-based data processing and decision making of RF detection. Further, the MCU 210 handles signaling and control, crypto communication, secure communication, and/or over-the-air (OTA) firmware update for the backpack 130. In some embodiments, the MCU 210 scans an RF spectrum of the communication signal that is received by the RF detection device (e.g., the RFIC 214) in order to identify communications associated with the personal communication device 110, the active case 120, and/or the backpack 130.

In some embodiments, the FPGA 212 is coupled to the MCU 210 through an FPGA/MCU interface 226-2 and is coupled to the RFIC 214 through an RF/FPGA interface 230-1. The FPGA 212 provides high speed data processing and digital filtering from greater than Gb/s to less than 100 kbps. In some embodiments, the FPGA 212 is operable to perform physical layer analysis 228, compare the energy detected by the RFIC 214 with a threshold in order to identify at least one energy burst, and evaluate whether the at least one energy burst matches a signal protocol signature of the signal protocol, as will be described in detail below with reference to FIG. 6.

In some embodiments, the RFIC 214 is coupled to the FPGA 212 through an RF interface 230-2. The RFIC 214 performs data conversion between RF and digital signals and is operable to detect energy carrying a communication signal to or from the personal communication device 110 and/or the active case 120. When in a receiving mode, the RFIC 214 allows the backpack 130 to perform its normal functions, e.g., RF signal detection etc. When in a transmitting mode, the RFIC 214 provides RF isolation of the user equipment 110, the active case 120, and/or the backpack 130. In some embodiments, the backpack 130 includes a remote communication device, operable to transmit wirelessly to a remote secure server. In some embodiments, the remote communication function is performed at least in part by the RFIC 214.

In some embodiments, the FEM 216 can detect RF signals and/or perform electromagnetic simulation, e.g., simulating RF performance, obtaining or setting RF characteristics as a function of carrier frequency, etc. In some embodiments, the FEM 216 includes at least one of an antenna tuner (also known as a matching network (MN)), an antenna switch (ASM), and/or an antenna (ANT) for wireless communication and/or electromagnetic simulation.

As explained above with reference to FIG. 1, the active case 120 has a housing that is arranged to received and hold the user equipment 110. Further, the backpack 130 can be attached to the active case 120. As such, at least parts of the UES (e.g., the active case 120 and/or the backpack 130) are in close distance to the user equipment 110, e.g., in the range of millimeters. Accordingly, different from conventional threat detection systems and methods that detect and monitor the user equipment 110 from a distance, the UES can detect potential threats faster and the threat detection is more accurate, e.g., detecting a surge of RF energy when a compromised user equipment 110 falsely reports its antenna status. Further, the UES (e.g., the active case 120 and/or the backpack 130) is capable of controlling sensor paths and/or communication paths associated with the user equipment 110, e.g., disabling the sensors and/or communication devices on the user equipment 110 and/or re-directing the information from the user equipment 110. As such, the UES can quickly react to the accurate threat detection, e.g., shutting down the user equipment 110, stop execution of malicious codes by the processor of the user equipment 110, stopping the communication of the user equipment 110 with a remote device, and/or shielding sensitive data from the user equipment 110, etc.

Figure 3:
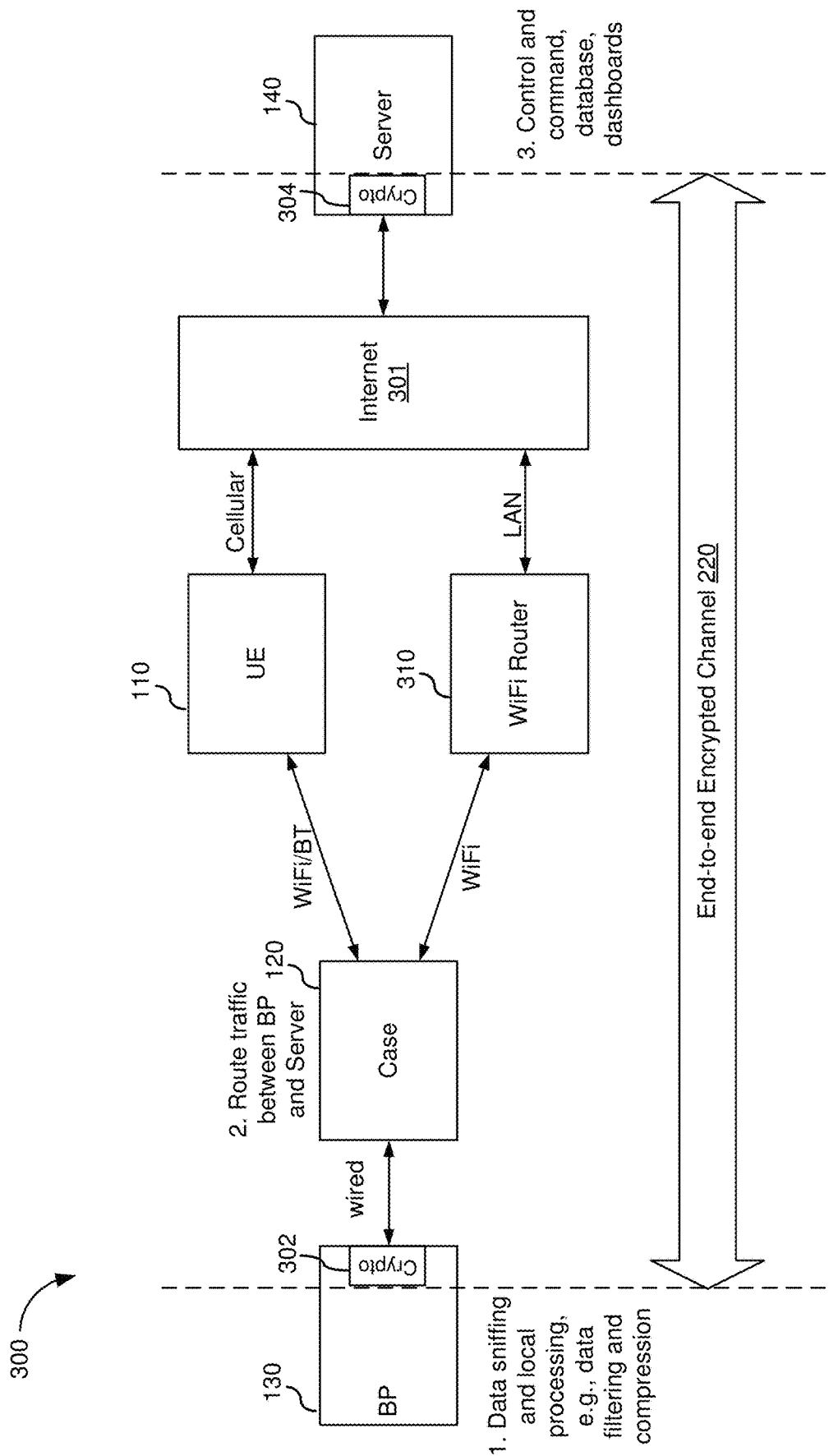
FIG. 3 illustrates an exemplary secure communication platform for RF emitter detection and mapping in accordance with some embodiments.

FIG. 3 illustrates an exemplary secure communication platform 300 for RF emitter detection and mapping in accordance with some embodiments. In some embodiments, the platform 300 includes the active case 120, the backpack 130, the personal communication device 110 held by the active case 120 and runs one or more applications, and the server 140 (e.g., a secure server) that comprises an online repository, analytics/processing, and/or client portal, etc. In some embodiments, an end-to-end encrypted channel (e.g., the secure communication channel 220) is established between the backpack 130 and the server 140 through the active case 120 and/or the user equipment 110 for added security and privacy protection.

For example, the backpack 130 provides the supplemental functionality of RF energy detection. As such, the backpack 130 sniffs data in the air and performs local processing, such as data filtering and compression. The backpack 130 includes a crypto unit 302 for encryption and decryption and exchanges encrypted data with the active case 120 through wired connection in accordance with some embodiments.

The active case 120 routes traffic between the backpack 130 and the server 140, including the traffic through the user equipment 110. In some embodiments, the secure server 140 also has a crypto unit 304 for encryption and decryption.

In some embodiments, the active case 120 communicates with the user equipment 110 and/or a WiFi router wirelessly. The wireless communication is encrypted, and the communication between the user equipment 110/the WiFi router and the server 140 through the internet 301, regardless wireless or wired, is also encrypted. As such, the server 140, which controls and sends commands based on information stored in its database and through dashboards in accordance with some embodiments, communicates with the backpack 130 and/or the active case 120 through the end-to-end encrypted channel 220.

As will be described below with reference to FIG. 7, the platform 300 is used for RF emitter detection and mapping in addition to anti-surveillance (e.g., audio and/or video), assured identity, and/or continuous multi-factor authentication for increased security and improved privacy protection. For example, the server 140 can obtain aggregated data from multiple active cases 120 and/or backpacks 130. In some embodiments, the server 140 can store the aggregated data, establish geofencing, update RF signal signatures, and communicate the information to the active case 120 and/or the backpack 130. The active case 120 and/or the backpack 130 can then use the information to quickly react to a malicious RF emitter.

Figure 4:
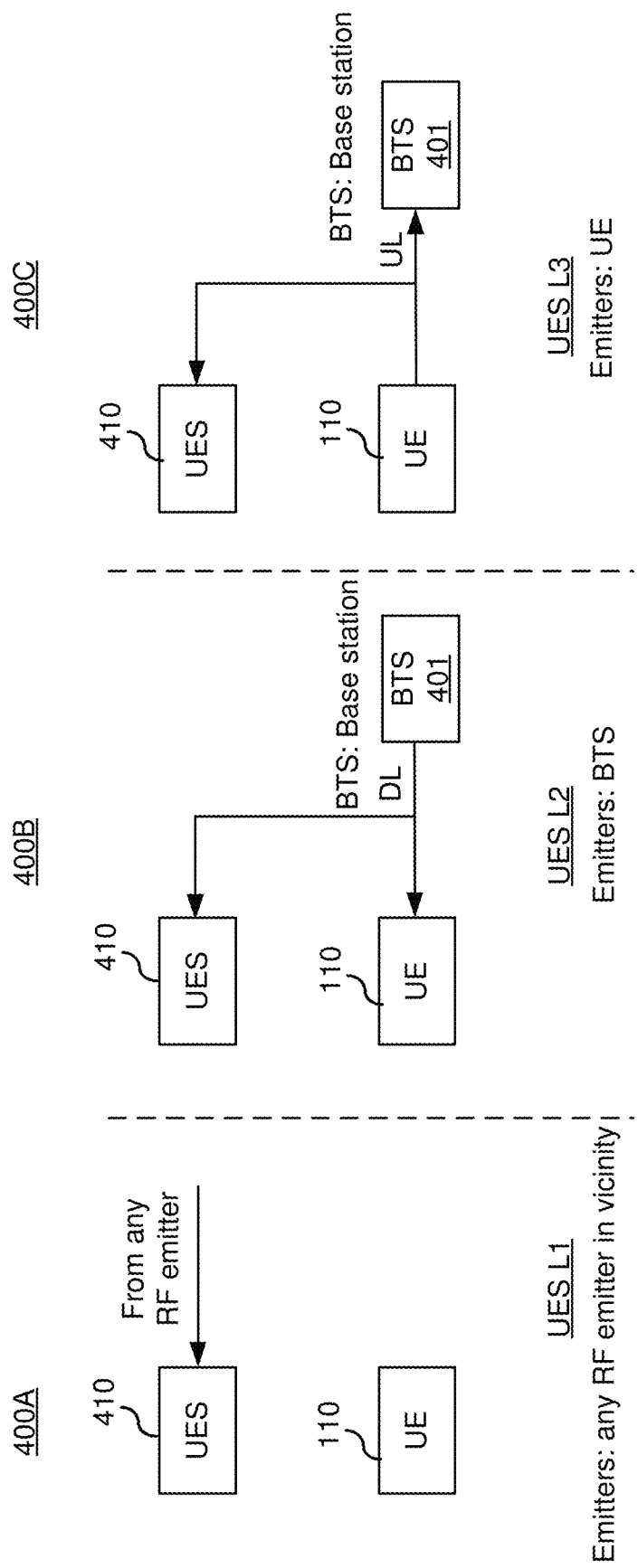
FIGS. 4A-4C illustrate various layers of RF signal characteristics extraction in accordance with some embodiments.

FIGS. 4A-4C illustrate various layers 400A-400C of RF signal characteristics extraction performed by UES 410 (e.g., the active case 120 and/or the backpack 130 in FIG. 1) in accordance with some embodiments. In some embodiments, as shown in FIG. 2, the MCU 210 and/or FPGA 212 of the backpack 130 scans the RF spectrum detected by the RFIC 214 and identifies signal protocol based on the signal signature patterns. Further, by sniffing the RF signals, the UES 410 can perform RF signal detection to derive characteristics of wireless communications associated with the detected RF signals.

In some embodiments, as shown in FIG. 4A, a first layer (e.g., UES L1) RF signal detection scans an RF spectrum and identifies signal protocols (e.g., cellular 2G/3G/4G, WiFi, etc.) and identifies any RF emitter in the vicinity, e.g., the user equipment 110, a base station, a WiFi hotspot, etc. During the RF signal sniffing, the UES can identify characteristics, such as the signal protocol (e.g., 2G/3G/4G), frequency, bandwidth, and/or Peak-To-Average Power Ratio (PAPR), etc.

In some embodiments, as shown in FIG. 4B, a second layer (e.g., UES L2) RF signal detection captures LTE downlink (DL) signals and extracts the cell tower parameters. As such, UES L2 RF signal detection can detect emitters that are base stations 401. In other words, when the base stations 401 are in communication with the user equipment 110, the UES 410 can derive characteristics of the base stations 401 based on the detected RF signals.

In some embodiments, as shown in FIG. 4C, a third layer (e.g., UES L3) RF signal detection decodes LTE uplink (UL) signals and performs analysis packet to extract TCP and IP headers for network traffic monitoring. As such, UES L3 RF signal detection can detect emitters that are user equipment 110 and extract information from wireless communications between the user equipment 110 and the base station 401.

Figure 5:
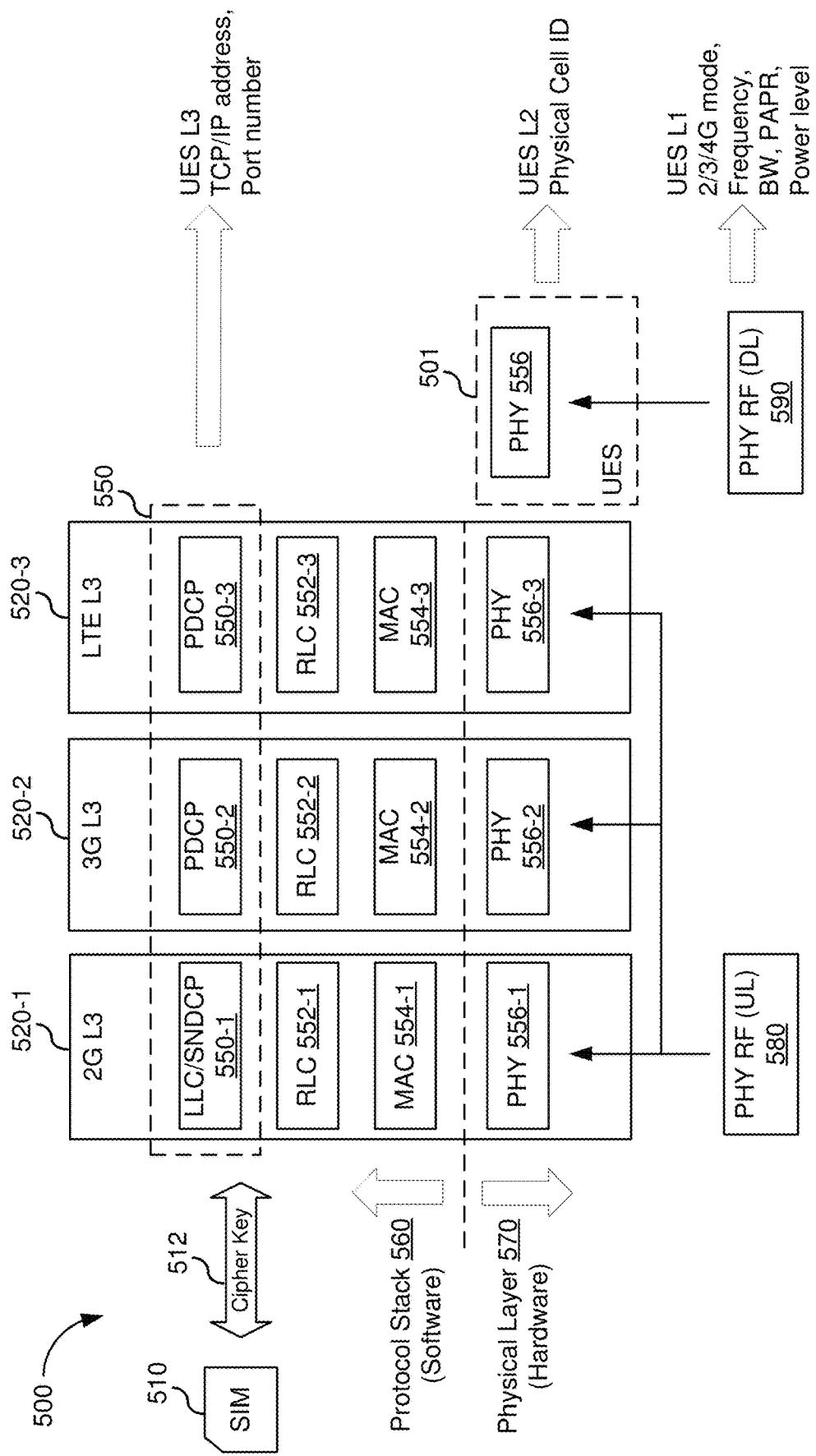
FIG. 5 illustrates an exemplary user equipment sniffer (UES) architecture for wireless communication signal characteristics extraction in accordance with some embodiments.

FIG. 5 illustrates an exemplary UES architecture 500 for wireless communication characteristics extraction in accordance with some embodiments. As described above with reference to FIG. 4A, through physical RF signal sniffing, including sniffing uplink RF signals 580 and/or downlink RF signals 590, the UES 501 can obtain RF characteristics of RF emitters in the vicinity, such as the signal protocol (e.g., 2G/3G/4G), frequency, bandwidth, and/or Peak-To-Average Power Ratio (PAPR), etc., in UES L1 RF signal detection. Further, through the downlink analysis 590 of physical layer packets 556 at the physical level 570, physical cell ID along with other cell tower parameters can be obtained in UES L2 RF signal detection.

In some embodiments, information of a SIM 510 used by the user equipment 110 for wireless communication can be obtained by the active case 120. The retrieval of the SIM card information from the personal communication device 110 is disclosed in U.S. Pat. App. No. 62/588,887, titled "Apparatus with Dual Subscriber Identity Module (SIM) Interfaces," which is incorporated by reference in its entirety. The SIM information obtained by the active case 120 includes a cipher key 512.

In some embodiments, using the cipher key 512, TCP/IP and/or port number for different LTE communications can be obtained in UES L3 RF signal detection. For example, in FIG. 5, in various wireless communication protocols 520 (e.g., 2G 520-1, 3G 520-2, or LTE 520-3), the protocol stack 560 above the physical layer 570 includes an MAC layer 554 for transport format and/or modulation, an RLC layer 552 for concatenation, and a PDCP/LLC/SNDCP layer 550 for compression. As is known in the art, Sub Network Dependent Convergence Protocol (SNDCP), is part of layer 3 of 2G protocol specification 520-1. SNDCP interfaces to the Internet Protocol at the top, and to the 2G-specific Logical Link Control (LLC) protocol at the bottom. Various embodiments of SNDCP for 2G support IP as the payload type. Also as is known in the art, PDCP is an abbreviation for Packet Data Convergence Protocol. The PDCP is located in the Radio Protocol Stack on top of the layer 2 protocol, Radio Link Control (RLC) layer 552, which is further on top of the Medium Access Control (MAC) layer 554. PDCP provides its services to IP at the UE or to the relay at the base station. In some embodiments, the header compression technique can be based on either IP header compression (RFC 2507) or Robust Header Compression (RFC 3095). If PDCP is configured for No Compression it can send the IP Packets without compression; otherwise it will compress the packets according to its configuration by upper layer and attach a PDCP header and send the packet. Applying the cipher key to the PDCP/LLC/SNDCP layer 1150, the TCP/IP address and/or port number for the wireless communication can be extracted.

Figure 6:
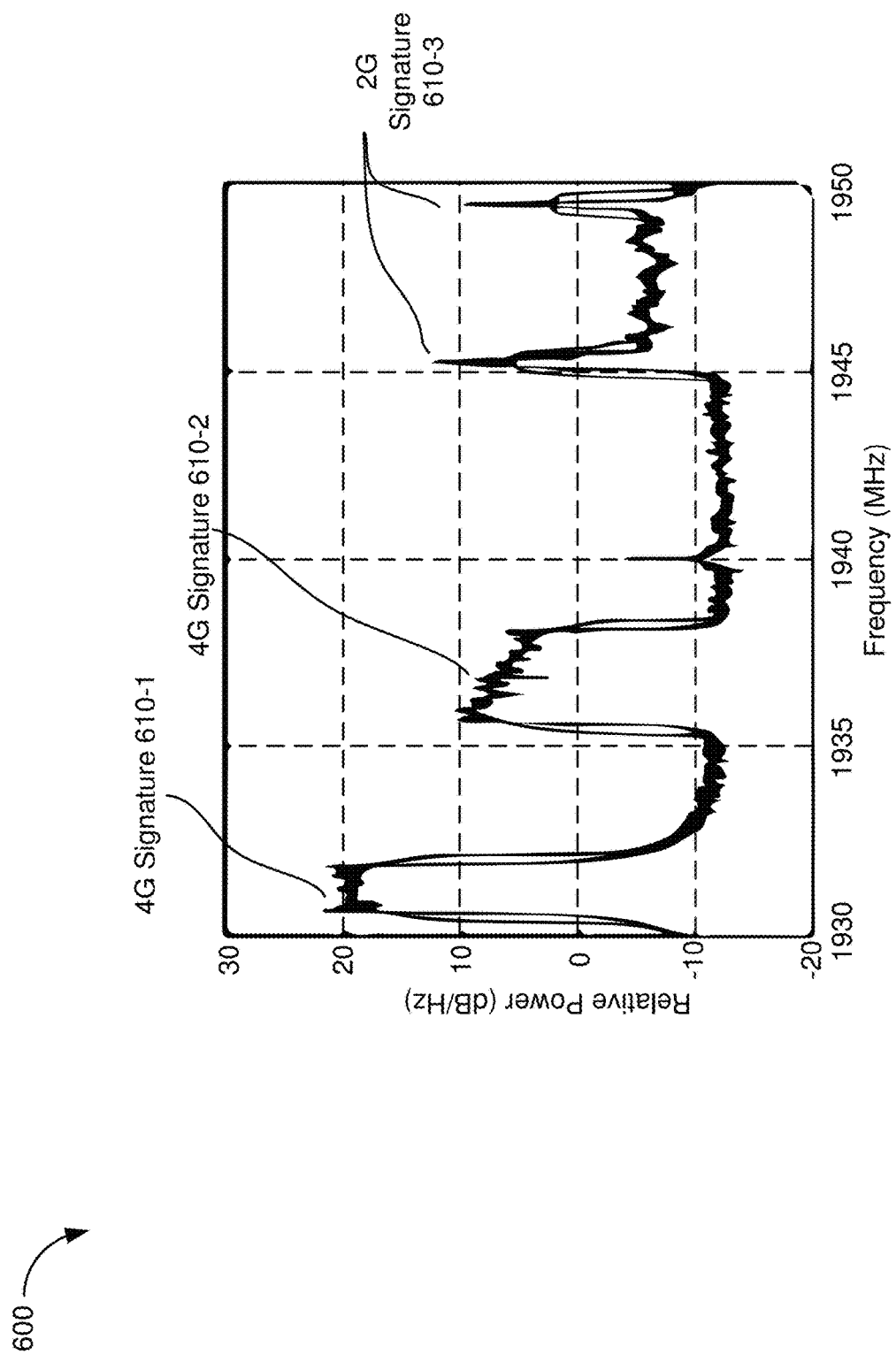
FIG. 6 illustrates RF energy signature patterns in accordance with some embodiments.

FIG. 6 illustrates exemplary protocol signatures 600 in UES L1 RF signal protocol identification process performed by the FPGA 212, in accordance with some embodiments. In some embodiments, the FPGA 212 is operable to compare the energy detected by the RFIC 214 with a threshold to identify at least one energy burst and evaluate whether the at least one energy burst matches a signal protocol signature of the signal protocol. For example, as shown in FIG. 6, an energy burst of the relative power of approximately 20 db/Hz in the 1930-1935 MHz spectrum is a signature 610-1 for 4G protocol; an energy burst of the relative power of approximately 10 dB/Hz in the 1935-1940 spectrum is a signature 610-2 for 3G and/or 4G protocol; two energy bursts of the relative power of approximately 5 dB/Hz and less in the 1945-1950 spectrum is a signature 610-3 for 2G protocol. As used herein, energy or power is a scalar (e.g., amplitude vs. time); whereas signal can be a scalar or a vector (e.g., amplitude/phase vs. time). In some embodiments, the protocol recognition described herein is achieved by extracting signal frequency band location, bandwidth, and peak-to-average power (PARP) ratio. Thus, energy detection can be performed by comparing signal amplitude, envelope, and/or waveform with the signatures in accordance with some embodiments disclosed herein.

Figure 7:
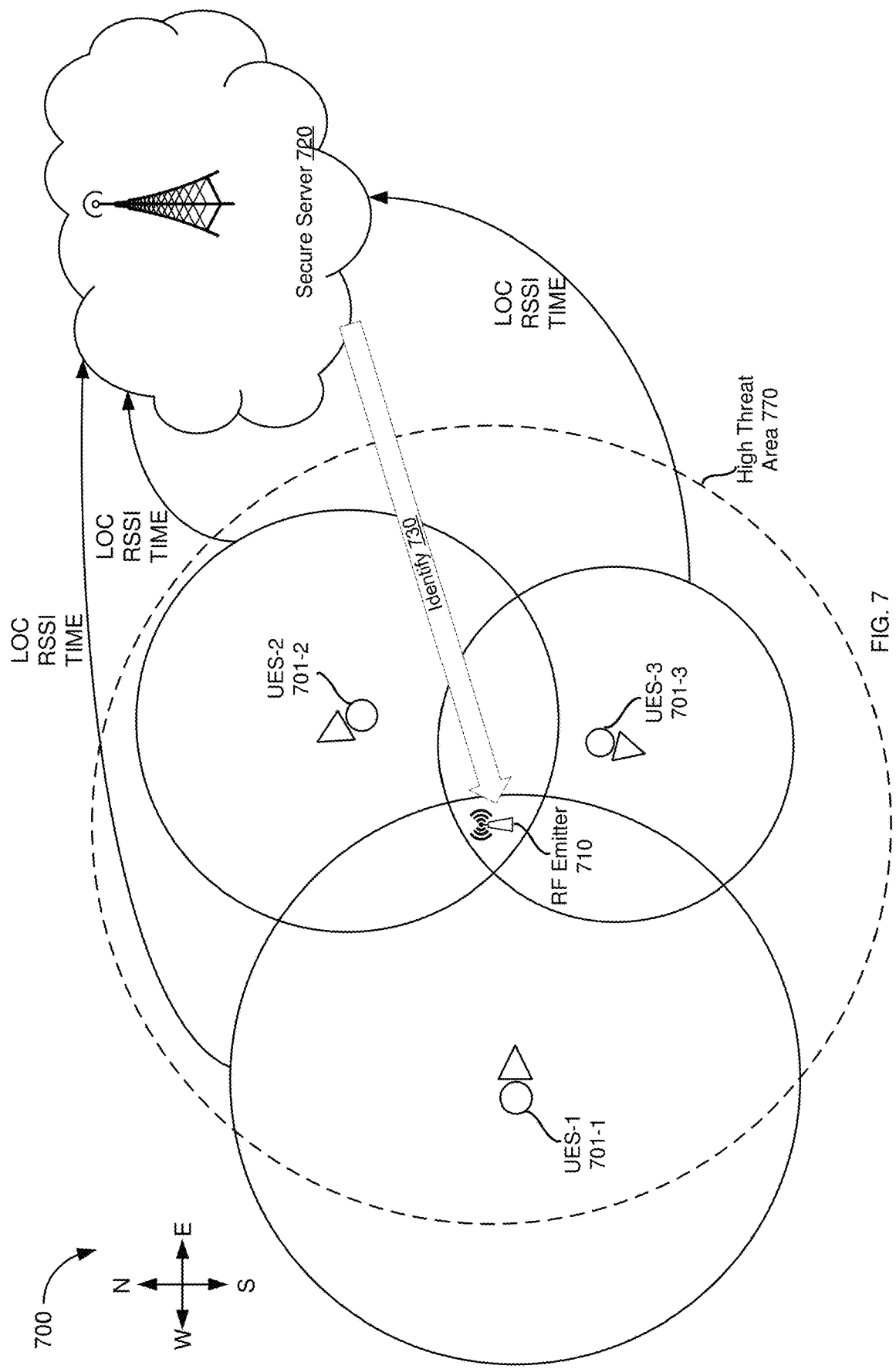
FIG. 7 illustrates an exemplary RF emitter mapping system in accordance with some embodiments.

FIG. 7 illustrates an exemplary multi-user distributed RF sensor network 700 for RF detection and mapping in accordance with some embodiments. In the multi-user environment 700, in some embodiments, each UES 701 (as indicated by a small circle in each big circle) sends receive signal strength indicator (RSSI) of each RF signature, time, and geolocation (e.g., from GPS) to a secure server 720 in order to triangulate and identify 730 stationary and moving emitter(s) 710. In some embodiments, the secure server 720 aggregates locations of RF emitters, generates a map including a whitelist of RF emitters (e.g., safe to communicate with) and a blacklist of RF emitters (e.g., malicious RF emitters and/or rogue base stations), and alerts the abnormal activities when the communication signal is associated with an RF emitter on the blacklist (e.g., when the UES holding the personal communication device is approaching an RF emitter in a high threat area 770). In some embodiments, during UES L1, a synchronized distributed network is used to generate the map.

In order to generate the map, in some embodiments, the synchronized distributed network includes operating multiple UESs 701 at the same frequency band of RF emitters to achieve RF emitter localization. In some embodiments, in order to detect moving RF emitters, e.g., drones or RF emitters on moving vehicles, frequency synchronized UESs 701 can be used in conjunction with spatial deployment, e.g., directing a UES 701 at a particular location to perform RF signal detection in order to obtain the triangulation of the moving RF emitter.

In some other embodiments, instead of synchronizing bandwidth, the synchronization in the distributed network is achieved by using the time stamp and/or server triggering signal. In some embodiments, calibration can be used to alignment synchronization. In some embodiments, alignment can be achieved by using GPS clock for time-stamp, cell tower broadcast signal, UE transmission, and/or combination of above. In such embodiments, the secure server 720 assigns broadband spectrum monitoring, e.g., by operating UES at different frequency bands. For example, the first UES 701-1 is assigned to operate at 900-920 MHz band, and the second 701-2 is assigned to operate at 920-940 MHz band, and so on. As such, the RF emitter 710 is not necessarily in communication with the personal communication device before being detected. For example, Phone A is operating in Band x, and the server issues a command to the respective UES 701 holding Phone B and Phone C in proximity to perform RF emitter detection of an RF emitter operating in Band y. In response to identifying that the RF emitter operating in Band y is malicious, the secure server 720 can direct the respective UES 701 holding Phone A to protect the Phone A even before the malicious RF emitter communicates with Phone A.

Figure 8A:
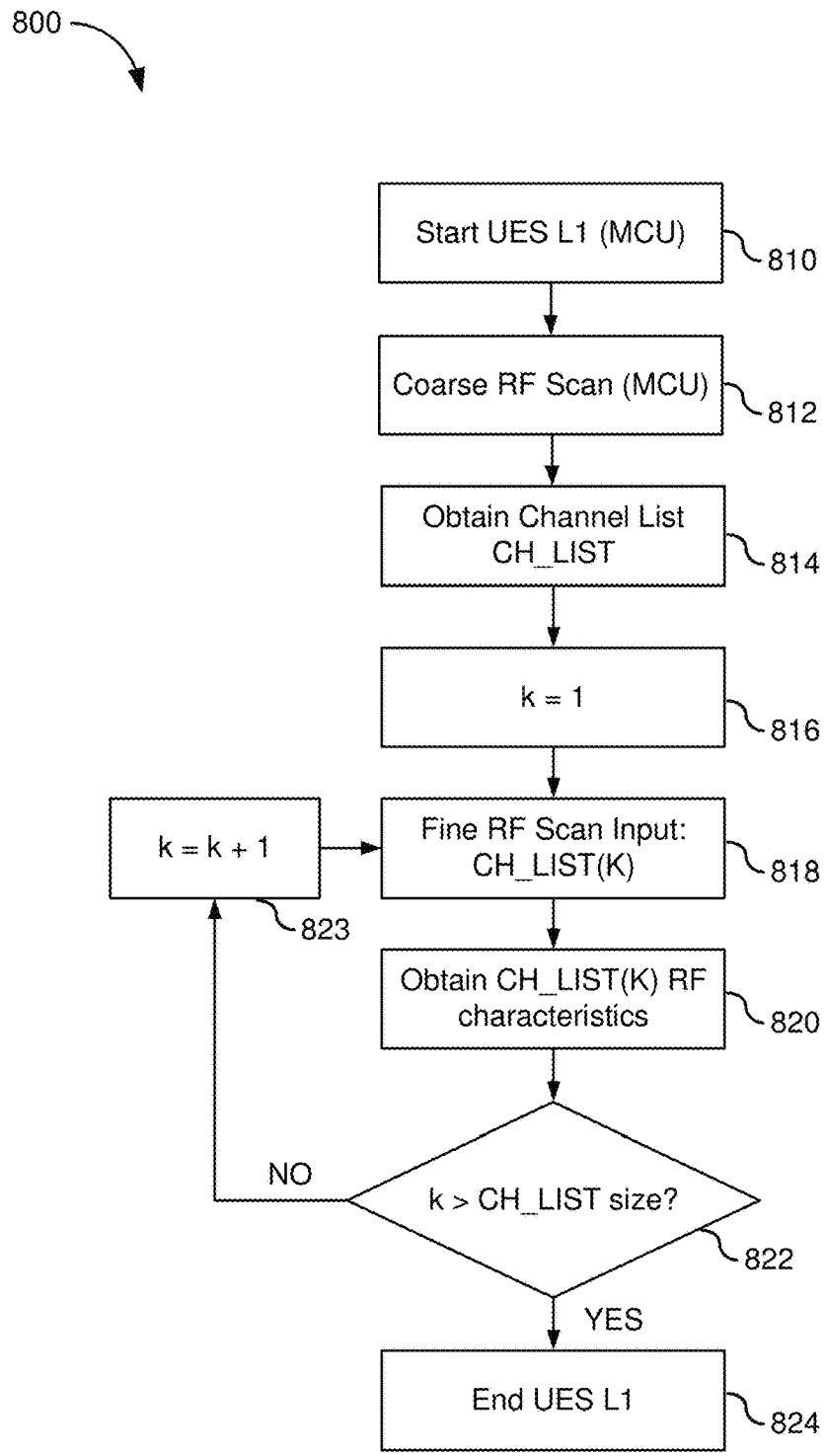
FIGS. 8A-8C is a flowchart illustrating the first layer of RF emitter detection by a user equipment sniffer (UES L1) in accordance with some embodiments.
Figure 8B:
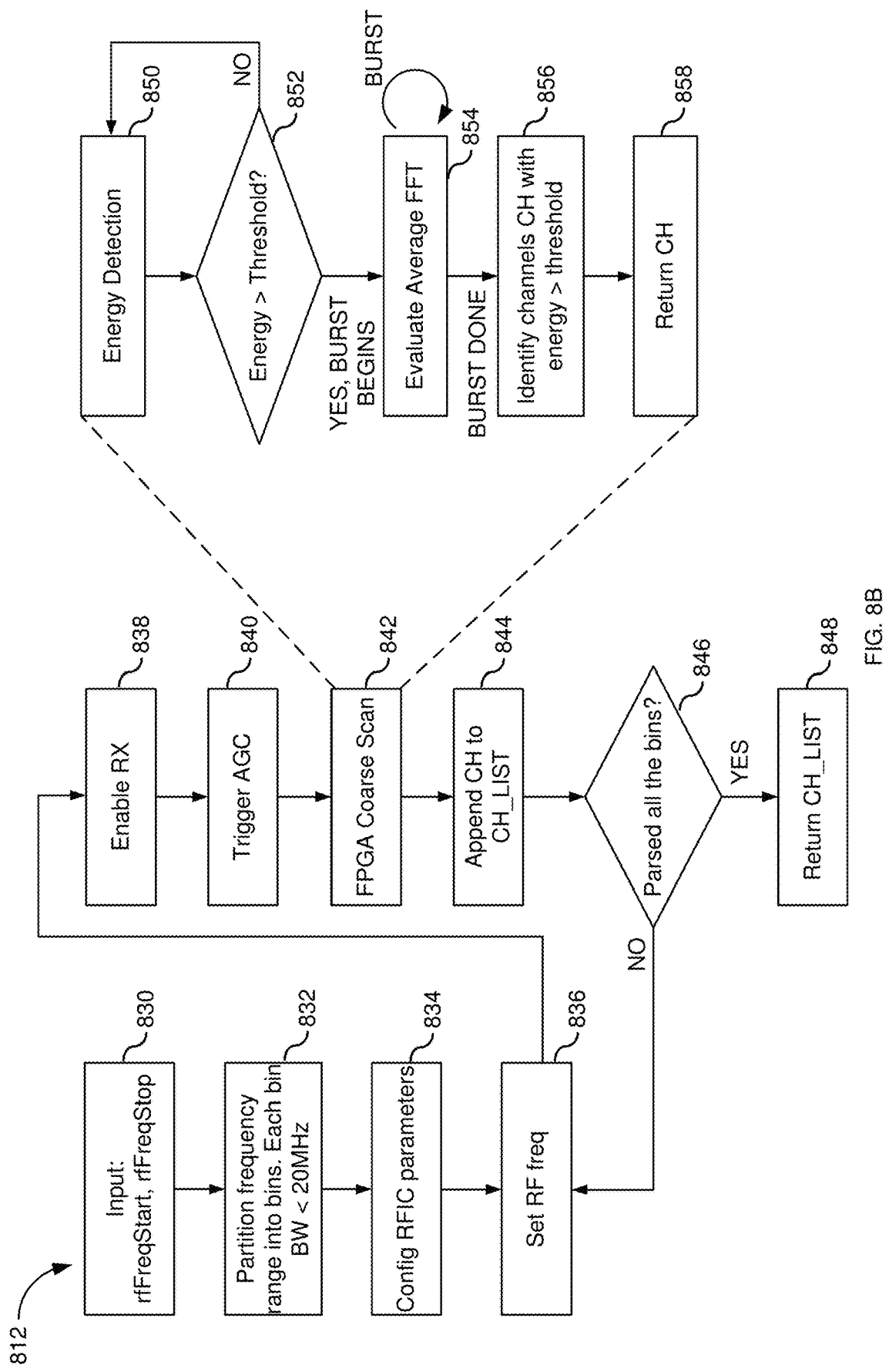
Figure 8C:
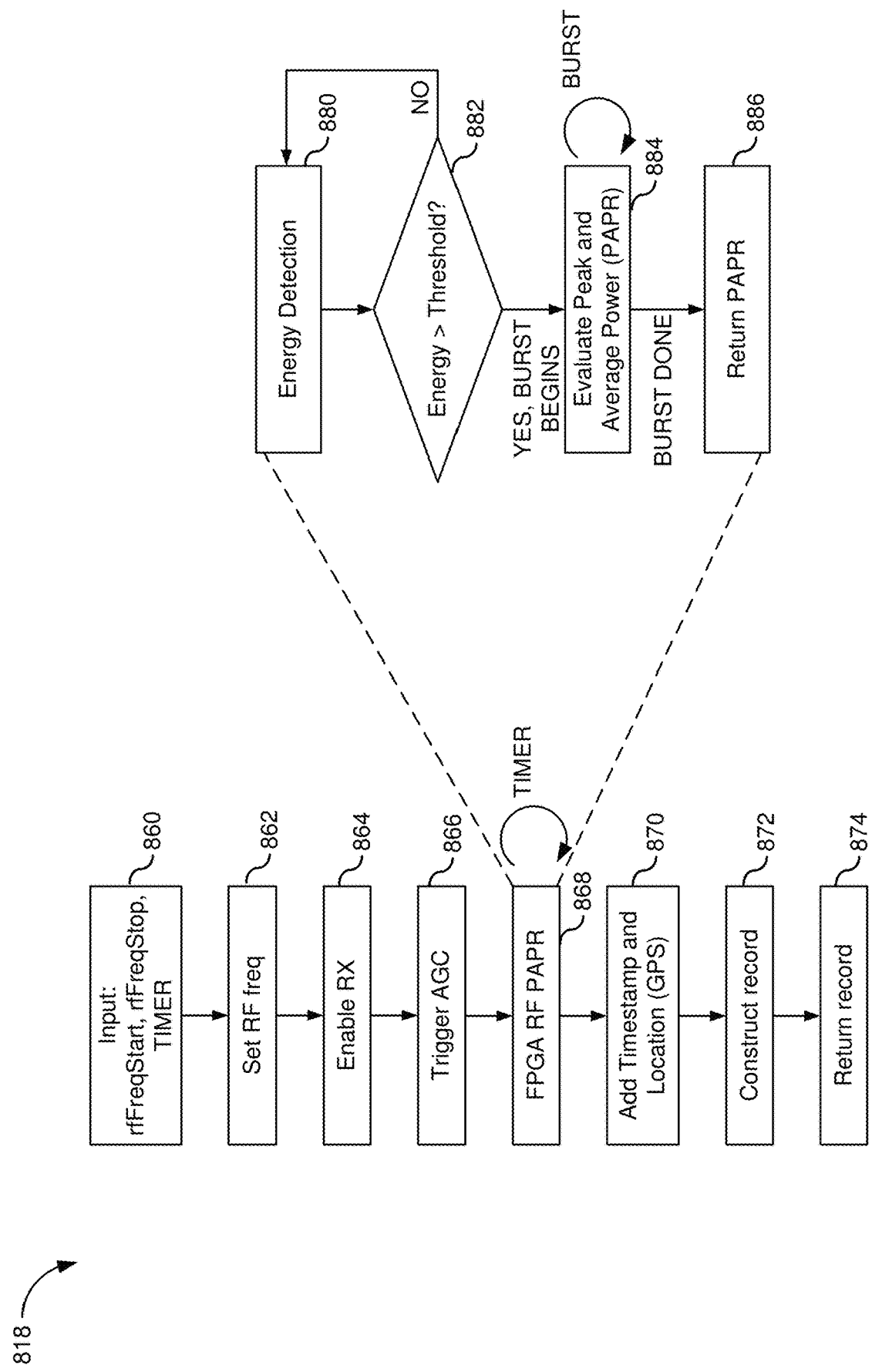

FIGS. 8A-8C illustrate an exemplary UES L1 flowchart 800 in accordance with some embodiments. In FIG. 8A, the process 800 starts in step 810 with the MCU 210 (FIG. 2) performing a coarse RF scan (step 812) in order to obtain a channel list (step 814). The coarse RF scan (step 812) is further described below with reference to FIG. 8B.

The process 800 then goes through a loop to finely scan each RF channel in the list in order to obtain RF characteristics. The loop starts with initiating a loop counter k in step 816. The fine scan of each RF channel performed in step 818 is further described below with reference to FIG. 8C. The MCU obtains RF characters as the result of the fine scan of each RF channel, as shown in step 820. The MCU then compares the loop counter with the size of the channel list in step 822 and increments the loop counter in step 823 in order to scan next channel in the list and obtain characteristics of RF signals corresponding to the next channel. The exemplary UES L1 process 800 ends in step 824 when each RF channel has been scanned and characteristics have been obtained.

FIG. 8B illustrates the coarse RF scan 812 in accordance with some embodiments. In some embodiments, as shown in step 830, inputs to the coarse RF scan include at least a lower boundary of the frequency range (e.g., rfFreqStart) and a higher boundary of the frequency range (e.g., rfFreqStop) for the coarse RF scan. In some embodiments, the MCU 210 partitions the input frequency range into bins, e.g., each bin bandwidth range is less than 20 MHz, as shown in step 832. The MCU 210 continues to configure RFIC 214 (FIG. 2) parameters for the bins (step 834). For each bin, the MCU 210 sets the RF frequency (step 836), enables the RFIC 214 in a receiving mode (step 838), triggers automatic gain control (AGC) (step 840), and starts an FPGA coarse scan (step 842), in accordance with some embodiments. The MCU 210 further appends the FPGA coarse scan result to the channel list (step 844) and determines whether all the bins have been parsed (step 846). In case there are more bins to scan, the MCU 210 continues the process from steps 836 through 844 for each bin. At the end of the coarse RF scan 812, when all the bins are scanned, the results are recorded in the channel list and obtained by the MCU 210 (step 848).

In some embodiments, the FPGA coarse scan for each bin (step 842) performed by the FPGA 212 (FIG. 2) includes an energy detection process (e.g., as described above with reference to FIG. 6). In some embodiments, the energy detection process starts with the detection of energy (step 850). When an energy burst is detected, e.g., the energy level is above a threshold (step 852), the energy burst is evaluated. In case, the energy burst does not match any signature as shown in FIG. 6 ("No" path from step 852), the energy detection process returns to step 850 for continued monitoring of the RF energy. In some embodiments, the continued monitoring of the RF energy stops when a threshold amount of time or a threshold number of trials is reached to avoid going into an infinite loop if no RF energy was detected. The FPGA coarse scan continues with the energy burst evaluation. During the energy burst evaluation, one or more energy bursts are evaluated, e.g., by evaluating an average fast Fourier transform (FFT) of each energy burst. As such, as shown in step 856, channels with energy greater than signature thresholds are identified. The FPGA 212 (FIG. 2) returns an identifier of the channel for the bin and is returned to the MCU 210 (FIG. 2) in step 858.

FIG. 8C illustrates the fine RF scan for each channel 818 performed by the MCU 210 (FIG. 2) in accordance with some embodiments. In some embodiments, as shown in step 860, the MCU 210 sets the fine RF scan input parameters, including a lower bound of the frequency range (e.g., rfFreqStart), an upper bound of the frequency range (e.g., rfFeqStop) for the fine RF scan, and a timer. Within the fine RF scan range specified by the fine RF scan input parameters, the MCU 210 set an RF frequency or an RF frequency subrange (step 862), enables the RFIC 214 in a receiving mode (step 864), triggers automatic gain control (AGC) (step 866), and starts an FPGA RF Peak-to-Average Power Ratio (PAPR) scan based on the timer (step 868). In some embodiments, the results from the FPGA RF PAPR scan are time-stamped and associated with a GPS location (step 870), as explained above with reference to FIG. 7. The records are then constructed (step 872) and recorded for each channel to return to the MCU 210 (step 874).

In some embodiments, the FPGA RF PAPR scan performed by the FPGA 212 (FIG. 2) in step 868 includes detecting energy bursts (steps 880 and 822) and evaluating peak and average power (PAPR) of the burst (step 884). In some embodiments, the RF energy burst detection step 880 stops when a threshold amount of time or a threshold number of trials is reached to avoid going into an infinite loop if no RF energy burst was detected. The result of the FPGA RF PAPR scan is returned (step 886) and used to construct the fine RF scan records for each channel.

FIG. 9 is an exemplary screen capture 900 of the sniffing results during UES L2 cell tower identification in accordance with some embodiments. In some embodiments, the controller (e.g., the MCU 210 in FIG. 2) includes a downlink signal analyzer. The downlink signal analyzer is operable to identify a physical cell identifier of the personal communication device from the downlink communication signal (e.g., extracting the physical cell identifier from downlink synchronization signal). In some embodiments, the network traffic information indicates whether an RF emitter that the personal communication device is in proximity with or in communication with is legitimate. In some embodiments, the network traffic information is obtained from a remote secure server (e.g., the secure server 720, FIG. 7) based on the physical cell identifier, a location of the UES, and a cell tower white-list. Thus, using this method of cell tower identification, legitimate RF emitter can be identified by the physical cell identifier extracted from downlink synchronization signal, the geolocation obtained through triangulation during UES L1, and/or a cell tower white-list in a server database. As shown in FIG. 9, the first line of the screen capture shows an RF emitter with a physical cell identifier.

In some embodiments, the downlink signal analyzer can further obtain a system information block (SIB) from a downlink broadcast control channel (BCCH) and derive characteristics associated with an RF emitter (e.g., a cell tower) transmitting the communication signal. Thus, using this method of cell tower identification, the UES captures cell tower details by demodulating and decoding downlink broadcast control channel (BCCH) to obtain cell tower details, such as master information block (MIB) and system information block (SIB) information.

As is known in the art, MIB and SIB are two types of System information (SI) that is broadcasted in the serving of a particular cell. SI is carried by the logical channel BCCH. MIB is a static part of SI and includes information such as the number of antennas, system bandwidth, configuration, transmitted power, and scheduling information. MIB is transmitted on the Physical Broadcast Control Channel (PBCH) of BBCH, e.g., BBCH→PBCH, with periodicity of every 40 ms. System Information Block (SIB) is a dynamic part of SI. It carries relevant information for the UE, which helps the UE to access a cell, perform cell re-selection, information related to frequency and cell selections. SIB is mapped on Downlink Shared Channel (DL-SCH), which in LTE is a transport channel used for the transmission of user data, dedicated control and user-specific higher layer information and downlink system information. The Physical Downlink Shared Channel (PDSCH) is the physical channel that carries the DL-SCH coded data. There are thirteen types of SIBs for LTE. For example, SIB is mapped on DL-SCH carried by PDSCH with periodicity of every 80 ms, 160 ms or 320 ms for SIB1, SIB2, and SIB3 respectively. Each SIB carries information related to specific tasks. For example, SIB1 carries cell access-related parameters like cell ID, MCC, MNC, TAC, scheduling of other SIBs. As shown at the bottom of the screen capture in FIG. 9, using demodulation and decoding of DL BCCH, MIB and SIB1 can be decoded to derive cell tower characteristics.

Figure 10:
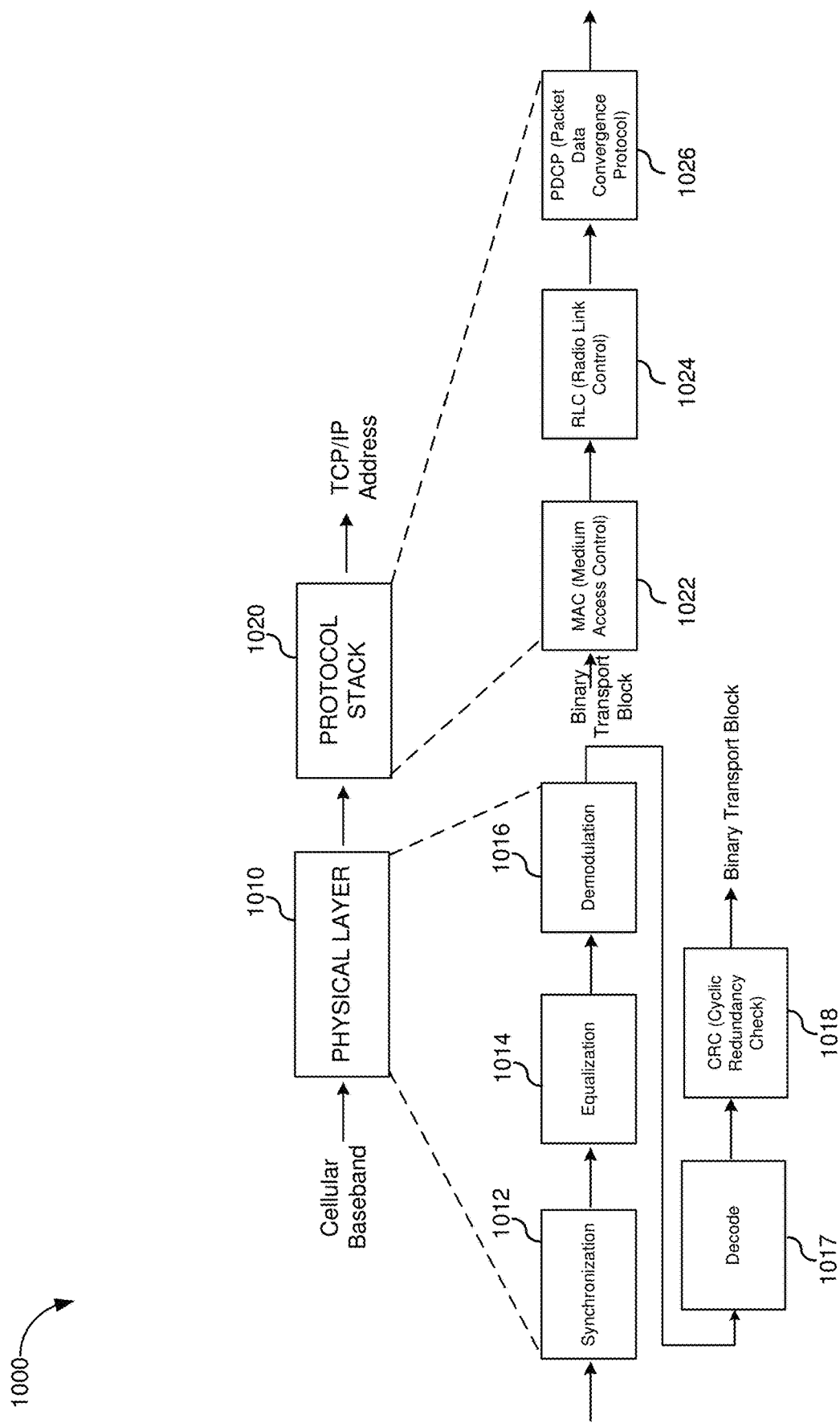
FIG. 10 is a flowchart illustrating TCP/IP header extraction in UES L3 RF detection in accordance with some embodiments.

FIG. 10 is an exemplary flow chart 1000 of TCP/IP header extraction in UES L3 RF detection. In some embodiments, the UES L3 decodes UL signals and performs packet analysis to extract TCP and IP headers for network traffic monitoring. In some embodiments, the UES L3 RF detection includes a physical layer (PHY) stack analysis 1010 and a protocol stack (P-stack) analysis 1020. The physical layer stack analysis 1010 typically includes synchronization 1012, equalization 1014, demodulation 1016, decoding 1017, and cyclic redundancy check (CRC) 1018 on cellular baseband in order to derive a binary transport block. The physical layer stack analysis 1010 is further described below with reference to FIGS. 11 and 12. The binary transport block is provided to the protocol stack analysis 1020 in order to derive the TCP/IP address. In some embodiments, the protocol stack analysis 1020 includes applying medium access control (MAC) 1022, radio link control (RLC) 1024, and package data convergence protocol (PDCP) 1026 layer analysis to the binary transport block to derive the TCP/IP headers. The protocol stack analysis 1020 is further described below with reference to FIG. 13.

Figure 11:
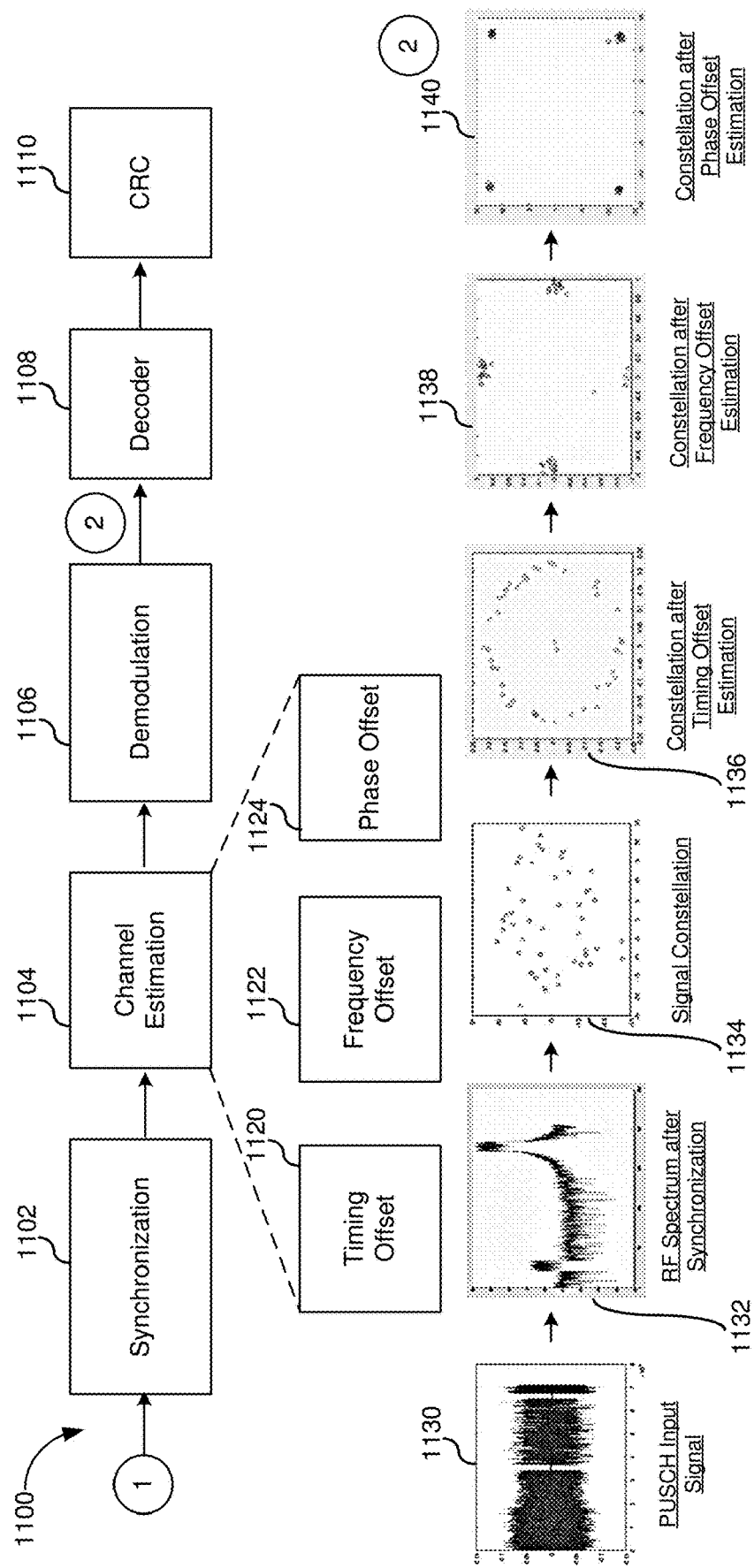
FIG. 11 is an exemplary process of channel estimation in UES L3 RF detection in accordance with some embodiments.

FIG. 11 is an exemplary process 1100 of channel estimation in UES L3 physical layer (PHY) RF signal detection in accordance with some embodiments. Conventional L3 RF signal detection methods and systems often face synchronization challenges in the physical layer. In order to perform the equalization step as shown in FIG. 10, conventional L3 RF signal detection methods and systems typically perform the steps of synchronization, Fast Fourier Transform (FFT), unmapping PUSCH, DeModulation Reference Signal (DMRS) correction, and Inverse Fast Fourier Transform (IFFT). In particular, the step of DMRS parameters in the step of DMRS correction are derived from downlink control information (DCI). Synchronizing both uplink and downlink in order to obtain the DMRS parameters is challenging.

To avoid monitoring DL and an expensive frequency duplexing (FDD) operation, the UES L3 RF signal detection disclosed herein performs synchronization 1102, demodulation 1106, and decoding 1108 to obtain metadata from the RF signals for CRC 1110. In some embodiments, as part of the synchronization process, the UES L3 RF signal detection process includes a channel estimation process 1104. As shown in FIG. 11, in some embodiments, the channel estimation 1104 includes timing offset 1120, frequency offset 1122, and phase offset 1124. In FIG. 11, taking PUSCH input signal 1130, the UES L3 RF signal detection process derives an RF spectrum after synchronization 1132. FIG. 11 also shows RF signal constellation 1134, constellation after timing offset estimation 1136, constellation after frequency offset estimation 1138, and the constellation after phase offset estimation 114.

As will be described below with reference to FIG. 12, by performing these estimations, the channels can be estimated, e.g., via demodulation reference signal (DMRS). For example, a receiver on the active case can apply timing offset 1120, frequency offset 1122, and phase offset 1124 to synchronize the received signal, where DMRS is the reference signal for synchronization. In other words, the receiver uses DMRS to get the correct timing, frequency, and phase offset, and apply them to synchronize PUSCH. It should be noted that the UES can be synchronized with either PUSCH or DMRS.

The UES channel estimation 1104 described herein in accordance with various embodiments works for high signal-to-noise ratio (SNR), as enabled by the close proximity (e.g., in the range of a few millimeters) between the backpack 130 and the user equipment 110. Due to the close proximity between the UES backpack 130 and the user equipment 110, the channel condition is relatively stable over time, and hence the timing offset, frequency offset, and phase offset are relatively stable as well.

Figure 12:
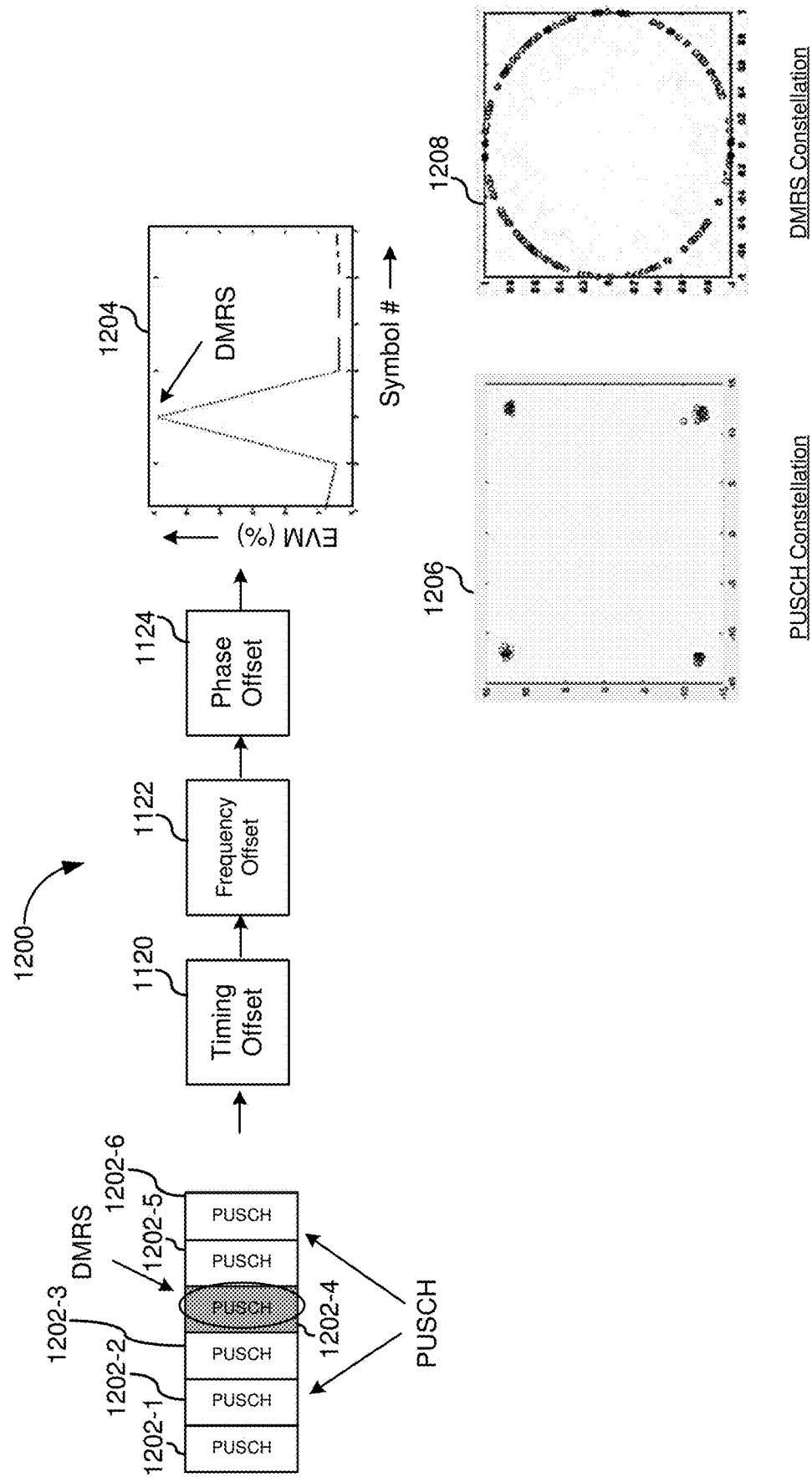
FIG. 12 illustrating identifying demodulation reference signal (DMRS) in UES L3 RF detection in accordance with some embodiments.

FIG. 12 illustrates an exemplary decode process 1200 of the physical layer stack analysis 1010 in UES L3 RF signal detection in accordance with some embodiments. Conventional decoders in the physical layer for L3 RF detection face several challenges. For example, a de-scrambler would need cell_id, subframe number, and C-Radio Network Temporary Indicator (C-RNTI) from down link control channel (DCCH). In another example, a turbo decoder would need transport block size (TBS) from DCCH. Typically, DMRS is located between PUSCH symbols. As shown in FIG. 12, DMRS is identified as among PUSCH symbols 1202, e.g., the PUSCH 1202-4 among the PUSCH symbols 1202-1, 1202-2, 1202-3, 1202-4, 1202-5, and 1202-6. Thus, applying UES channel estimation to data frames as described in FIG. 11, including the timing offset 1120, the frequency offset 1122, and the phase offset 1124, the corrected PUSCH Error Vector Magnitude (EVM) can be within 2%, and the symbol with EVM greater than 4% is considered as DMRS, as shown in a screen capture 1204 in FIG. 12. FIG. 12 further shows a PUSCH constellation 1206 and a DMRS constellation 1208.

In some embodiments, an exhaustive search can be done for smaller number of combinations. In some embodiments, the controller (e.g., the MCU 210 in FIG. 2) includes an uplink physical layer analyzer coupled to a remote communication device (e.g., cellular, WiFi, LoRa modems/chips on the active case 120 and/or the backpack 130). In some embodiments, the uplink physical layer analyzer is operable to instruct the remote communication device to upload packets associated with the DMRS to a remote secure server (e.g., the server 140 through the end-to-end encrypted channel 220 as shown in FIG. 3 or to the secure server 720 associated with the secure base station as shown in FIG. 7), and obtain from the remote secure server, via the remote communication device, parameters extracted from the packets for decoding the uplink communication signal. In other words, to get TCP/IP header as will be described below with reference to FIG. 13, the system needs cell_id and subframe number from DMRS, and C-RNTI and/or TBS from PUSCH. Using the methods and systems described in accordance with embodiments, C-RNTI is obtained from the remote secure server and sent back to the UES. The UES can then perform local processing to obtain TBS.

Figure 13:
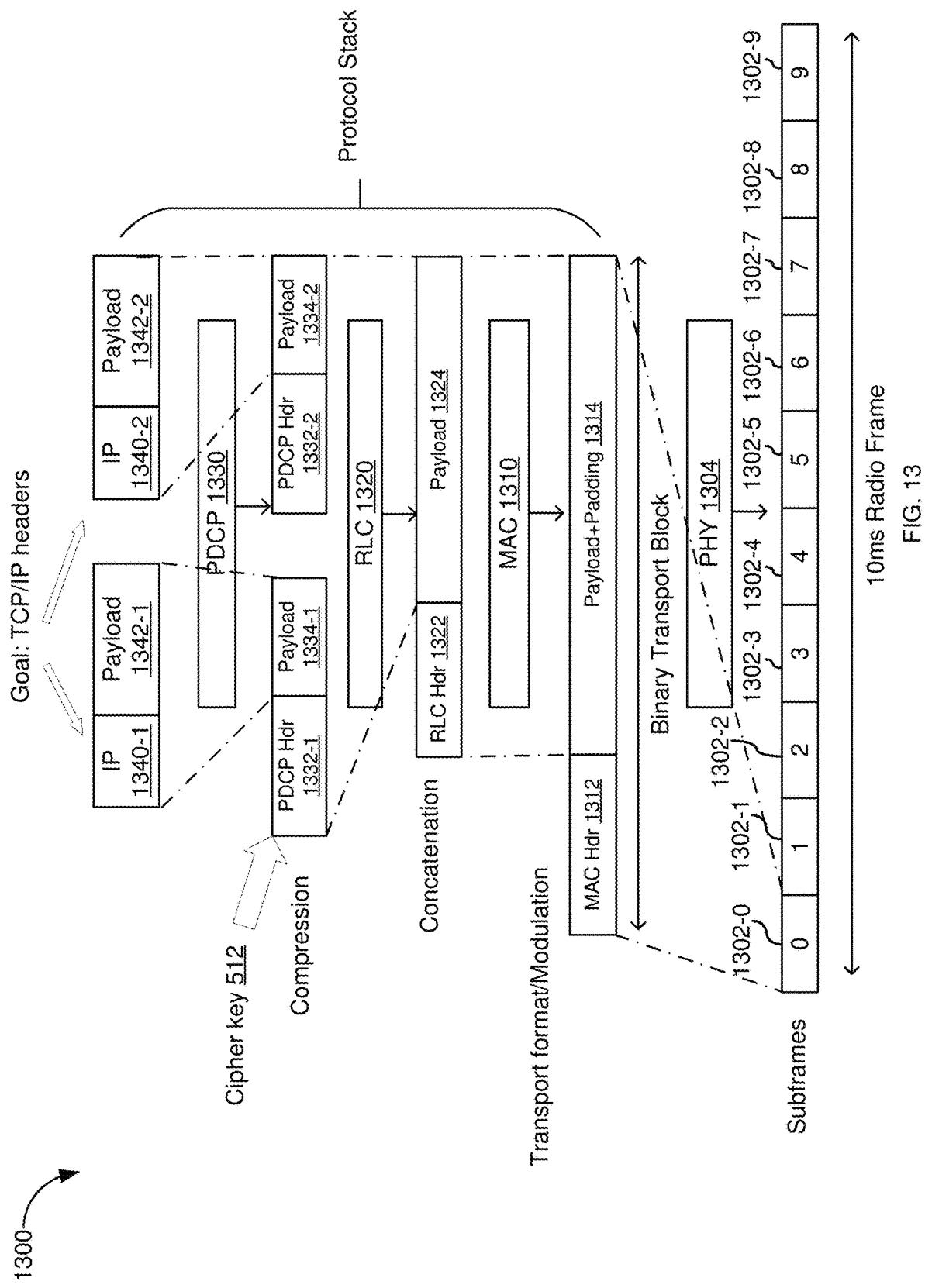
FIG. 13 illustrates an exemplary TCP/IP header extraction in UES L3 RF detection in accordance with some embodiments.

FIG. 13 illustrates an exemplary protocol stack (P-stack) 1300 in accordance with some embodiments. A typical network protocol stack from the bottom includes physical 1304, MAC 1310, RLC 1320, Packet Data Convergence Protocol (PDCP) 1330, and IP layer. Each packet in the IP layer includes an IP header 1340 and a payload portion 1342. Likewise, each packet in the PDCP layer 1330 includes a PDCP header 1332 and a payload portion 1334; each packet in the RLC layer 1320 includes a RLC header 1322 and a payload portion 1324, and each packet in the MAC layer 1310 includes an MAC header 1312 and a payload portion 1314. In an exemplary 10 ms radio frame as shown in FIG.

13, each physical layer 1304 packet corresponds to a subframe 1302. In some embodiments, applying the processes described above with reference to FIGS. 10-12 to the physical layer 1304, the physical layer 1304 provides the MAC layer 1310 above the decoded binary transport block for processing. In some embodiments, in order to derive the TCP/IP header 1340 in the IP layer packet, the UES applies the cipher key 512 to the PDCP layer 1330 packets. The application of the cipher key 512 to the PDCP layer 1330 packets allows extraction of the TCP/IP header 1340 from the IP layer packet. Accordingly, in UES L3 RF emitter detection, the UES can derive information such as TCP/IP address and/or port number, etc.

FIG. 14 illustrates an exemplary cipher key derivation table 1400 in accordance with some embodiments. As explained above, the UES can obtain information of a SIM used by the user equipment for wireless communication. The retrieval of the SIM card information from the user equipment is disclosed in U.S. Pat. App. No. 62/588,887, titled "Apparatus with Dual Subscriber Identity Module (SIM) Interfaces," which is incorporated by reference in its entirety. In some embodiments, the SIM information obtained by the UES includes Key Access Security Management Entries (Kasme) 1402, Non-access stratum (NAS) count 1404, and Algorithm ID (Alg-ID) 1406 for NAS security. As explained above, the physical cell ID 1408 can be obtained using processes as described above with reference to UES L2 RF emitter detection, and the C-RNTI 1410 can be obtained in UES L3 PHY exhaustive search as described above with reference to FIG. 12. Accordingly, in some embodiments, the cipher key can be generated (e.g., with circuitry) as a function of Kasme, NAS, Alg-ID, physical cell ID, and C-RNTI.

The UES L3 RF detection disclosed herein in accordance with various embodiments has several advantages. First, the UES L3 RF detection technics disclosed herein have high signal-to-noise ratio (SNR) due to the close proximity between the UES and the user equipment 110 (e.g., within the range of a few millimeters). Due to the close proximity, the channel condition is relative stable. As a result, as described above, simplified channel estimation, demodulation, and decoder allow lower power consumption by the RF emitter detection. Thus, the UES can provide undisrupted privacy protection for a long duration without being charged.

Second, the UES L3 RF detection technics disclosed in accordance with various embodiments herein simplify the RF detection process. Relative to parsing the complex physical uplink control channel (PUCCH), decoding physical uplink shared channel (PUSCH) is easier. Further, the UES L3 RF detection technics disclosed in accordance with various embodiments herein reduce system complexity and hardware components (e.g., RF filters) by avoiding a frequency duplexing (FDD) operation. The UES estimates DL parameters to avoid stringent FDD and time duplexing (TDD) operation. The UES L3 RF detection technics disclosed herein can then use the decoded PUSCH information to extract TCP/IP information.

Third, the SIM card information from the personal communication device 110 can be retrieved through the UES. Using the SIM card information, as explained above with reference to FIG. 14, a cipher key can be derived, thus enabling access to session keys for PDCP decryption in the link layer by UES as shown with reference to FIG. 13.

Fourth, the UES L3 RF detection techniques disclosed in accordance with various embodiments herein is not sensitive to latency. Not all packets need to be captured for decryption. Consequently, since a few packets are needed, remote processing is possible, e.g., uploading a few packets to a remote server (e.g., the server 140 through an end-to-end encrypted channel as shown in FIG. 3 or to the secure server 720 associated with a secure base station as shown in FIG. 7) for processing to further conserve the processing power and battery power of the UES.

For example, cell_id and subframe number can be extracted from DMRS with exhaustive search of the possible combinations of cell_id and subframe numbers. Since C-RNTI is a 16-bit parameter, the combination with transport block size (TBS) (e.g., 16 possibilities) results in possible combinations too large for local processing. The solution is to upload the packet to server to perform exhaustive search. Since C-RNTI lasts for connection session, only a few packets for C-RNTI are needed at connection establishment. As such, the exhaustive search for the 16-combination TBS can be done locally once C-RNTI is extracted. The consideration is reduced to the data rate for uploading the packets.

In FIG. 11, using 12-bit analog-to-digital converters (ADC), I/Q channels, and 30.72M samples/second, the incoming data rate at point ① prior to synchronization is 12-bit×2 channels×30.72M=737.28 Mbit/second. At point ② after channel estimation described herein and demodulation, the maximum data rate for 16 Quadrature Amplitude Modulation (QAM), 100 Resource Block (RB) (1200 subcarriers) per symbol, and 66.67 usec/symbol, the maximum data rate for a Channel Bandwidth (CBW) of 20 MHz and 1 user would be 4 bit×1200/66.7 usec=72 Mbit/second. In another example, for CBW=10 MHz and 10 users, a different type of modulation quadrature phase-shift keying (QPSK), 5 RB (60 subcarriers) per symbol, 66.67 usec/symbol, and 50% burst rate, the typical data rate would be 2-bit×120/66.7 usec*0.5=0.9 Mbit/second. In order to extract C-RNTI, only a few random packets need to be uploaded at a connection establishment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a server connectable to a plurality of backpacks, wherein the server is connectable to each of the plurality of backpacks via a respective case connectable to a respective personal communication device and the respective personal communication device is connectable to the server:
   assigning a first set of backpacks to monitor a first frequency range, including assigning each of the first set of backpacks to scan a first RF spectrum corresponding to the first frequency range, obtain first RF characteristics of the first RF spectrum, and send the first RF characteristics to the server;
   assigning a second set of backpacks, different from the first set of backpacks, to monitor a second frequency range, different from the first frequency range, including assigning each of the second set of backpacks to scan a second RF spectrum corresponding to the second frequency range, obtain second RF characteristics of the second RF spectrum, and send the second RF characteristics to the server;

aggregating radio frequency (RF) signal information obtained by the first set and the second set of backpacks, including aggregating the first RF characteristics and the second RF characteristics; and identifying characteristics of at least one RF emitter operating in one or more of the first frequency range and the second frequency range based on the aggregated RF signal information, wherein, when paired with the active case and the personal communication device, each respective backpack is operable to provide supplemental functionalities to the personal communication device, including detecting RF energy emissions used to identify the characteristics of the at least one RF emitter.

2. The method of claim 1, further comprising:

receiving the RF signal information through a respective secure channel between the server and a respective backpack of the plurality of backpacks via the respective apparatus communicatively connected to the respective backpack and the respective personal communication device, and the respective personal communication device communicatively connected to the server.

3. The method of claim 1, wherein the RF signal information includes for an RF signal detected by a respective backpack, one or more of a communication protocol, a frequency, a bandwidth, a peak-to-average-power ratio (PAPR), and a power level associated with the RF signal.

4. The method of claim 1, wherein assigning the first set of backpacks to monitor the first frequency range includes causing the first set of backpacks to detect RF signals one or more of timestamps and locations associated with the RF signals.

5. The method of claim 4, wherein:

the at least one RF emitter includes an RF emitter operating in the first frequency range proximate to the first set of the backpacks; and identifying the characteristics of the at least one RF emitter includes calculating a location of the RF emitter based on the timestamps and the locations.

6. The method of claim 4, further comprising:

synchronizing the first set of backpacks based on the timestamps.

7. The method of claim 1, further comprising:

determining the characteristics of the at least one RF emitter indicate abnormal activities in a respective RF spectrum; and providing a notification to at least one of a personal communication device, an apparatus, or a backpack proximate to the at least one RF emitter.

8. A system comprising: a server including one or more processors and a non-transitory memory; and a plurality of backpacks, wherein the server is connectable to each of the plurality of backpacks via a respective case connectable to a respective personal communication device and the respective personal communication device is connectable to the server;

wherein the instructions, when executed, cause the one or more processors to perform operations comprising:

assigning a first set of backpacks to monitor a first frequency range, including assigning each of the first set of backpacks to scan a first RF spectrum corresponding to the first frequency range, obtain first RF characteristics of the first RF spectrum, and send the first RF characteristics to the server;

assigning a second set of backpacks, different from the first set of backpacks, to monitor a second frequency range, different from the first frequency range, including assigning each of the second set of backpacks to scan a second RF spectrum corresponding to the second frequency range, obtain second RF characteristics of the second RF spectrum, and send the second RF characteristics to the server;

aggregating radio frequency (RF) signal information obtained by the first set and the second set of backpacks, including aggregating the first RF characteristics and the second RF characteristics; and identifying characteristics of at least one RF emitter operating in one or more of the first frequency range and the second frequency range based on the aggregated RF signal information, wherein, when paired with the active case and the personal communication device, each respective backpack is operable to provide supplemental functionalities to the personal communication device, including detecting RF energy emissions used to identify the characteristics of the at least one RF emitter.

9. The system of claim 8, wherein the instructions, when executed, further cause the one or more processors to perform operations including:

receiving the RF signal information through a respective secure channel between the server and a respective backpack of the plurality of backpacks via the respective apparatus communicatively connected to the respective backpack and the respective personal communication device, and the respective personal communication device communicatively connected to the server.

10. The system of claim 8, wherein the RF signal information includes for an RF signal detected by a respective backpack, one or more of a communication protocol, a frequency, a bandwidth, a peak-to-average-power ratio (PAPR), and a power level associated with the RF signal.

11. The system of claim 8, wherein assigning the first set of backpacks to monitor the first frequency range includes causing the first set of backpacks to detect RF signals one or more of timestamps and locations associated with the RF signals.

12. The system of claim 11, wherein:

the at least one RF emitter includes an RF emitter operating in the first frequency range proximate to the first set of the backpacks; and identifying the characteristics of the at least one RF emitter includes calculating a location of the RF emitter based on the timestamps and the locations.

13. The system of claim 11, wherein the instructions, when executed, further cause the one or more processors to perform operations including:

synchronizing the first set of backpacks based on the timestamps.

14. The system of claim 8, wherein the instructions, when executed, further cause the one or more processors to perform operations including:

determining the characteristics of the at least one RF emitter indicate abnormal activities in a respective RF spectrum; and providing a notification to at least one of a personal communication device, an apparatus, or a backpack proximate to the at least one RF emitter.

15. A non-transitory computer readable storage medium having instructions stored therein, wherein when the instructions are executed by a server including one or more processors,
- wherein the server is connectable to each of a plurality of backpacks via a respective case connectable to a respective personal communication device and the respective personal communication device is connectable to the server, the instructions cause the server to perform operations comprising:
- assigning a first set of backpacks to monitor a first frequency range, including assigning each of the first set of backpacks to scan a first RF spectrum corresponding to the first frequency range, obtain first RF characteristics of the first RF spectrum, and send the first RF characteristics to the server;
- assigning a second set of backpacks, different from the first set of backpacks, to monitor a second frequency range, different from the first frequency range, including assigning each of the second set of backpacks to scan a second RF spectrum corresponding to the second frequency range, obtain second RE characteristics of the second RF spectrum, and send the second RF characteristics to the server;
- aggregating radio frequency (RF) signal information obtained by the first set and the second set of backpacks, including aggregating the first RF characteristics and the second RF characteristics; and
- identifying characteristics of at least one RF emitter operating in one or more of the first frequency range and the second frequency range based on the aggregated RF signal information, wherein, when paired with the active case and the personal communication device, each respective backpack is operable to provide supplemental functionalities to the personal communication device, including detecting RF energy emissions used to identify the characteristics of the at least one RF emitter.

16. The non-transitory computer readable storage medium of claim 15, wherein when the instructions are executed by the server, further cause the server to perform operations comprising:
- receiving the RF signal information through a respective secure channel between the server and a respective backpack of the plurality of backpacks via the respective apparatus communicatively connected to the respective backpack and the respective personal communication device, and the respective personal communication device communicatively connected to the server.

17. The non-transitory computer readable storage medium of claim 15, wherein the RF signal information includes for an RF signal detected by a respective backpack, one or more of a communication protocol, a frequency, a bandwidth, a peak-to-average-power ratio (PAPR), and a power level associated with the RF signal.

* * * * *